(12) United States Patent
Ali et al.

(10) Patent No.: US 11,873,233 B1
(45) Date of Patent: Jan. 16, 2024

(54) PREPARING MAGNETITE AND AKAGANÉITE NANOPARTICLES FROM STEEL SLAG AS A RAW MATERIAL FOR WASTEWATER TREATMENT

(71) Applicant: KING FAISAL UNIVERSITY, Al-Ahsa (SA)

(72) Inventors: Mai Mustafa Khalaf Ali, Al-Ahsa (SA); Hany Mohamed Abd El-Lateef Ahmed, Al-Ahsa (SA); Maria A. Villa-Garcia, Al-Ahsa (SA); Ahmed M. Abu-Dief, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/211,747

(22) Filed: Jun. 20, 2023

(51) Int. Cl.
| | |
|---|---|
| *C01G 49/06* | (2006.01) |
| *B01J 20/10* | (2006.01) |
| *B01J 20/28* | (2006.01) |
| *B01J 20/30* | (2006.01) |
| *C02F 1/28* | (2023.01) |

(Continued)

(52) U.S. Cl.
CPC ............. *C01G 49/06* (2013.01); *B01J 20/06* (2013.01); *B01J 20/103* (2013.01); *B01J 20/28004* (2013.01); *B01J 20/28009* (2013.01); *B01J 20/28016* (2013.01); *B01J 20/3021* (2013.01); *B01J 20/3071* (2013.01); *B01J 20/3085* (2013.01); *C02F 1/281* (2013.01); *C01P 2002/72* (2013.01); *C01P 2002/82* (2013.01); *C01P 2004/03* (2013.01); *C01P 2004/04* (2013.01); *C01P 2004/61* (2013.01); *C01P 2006/42* (2013.01); *C02F 2101/308* (2013.01); *C02F 2305/08* (2013.01)

(58) Field of Classification Search
None
See application file for complete search history.

(56) References Cited

U.S. PATENT DOCUMENTS 2,746,920 A * 5/1956 Wunderley ............... C02F 9/00
423/166
5,296,042 A * 3/1994 Curran ..................... C23G 1/24
134/41

(Continued)

FOREIGN PATENT DOCUMENTS

| CN | 103801263 A | 5/2014 |
|---|---|---|
| CN | 108117274 A | 6/2018 |

(Continued)

OTHER PUBLICATIONS

Mochizuki, et al.; "Adsorption of phosphate from aqueous using iron hydroxides prepared by various methods.", Center for Advanced Research of Energy and Materials, Faculty of Engineering, Hokkaido University, Kita 13 Nishi 8, Kita-ku, Sapporo, 060-8628, Japan.

(Continued)

*Primary Examiner* — Chester T Barry
(74) *Attorney, Agent, or Firm* — Nath, Goldberg & Meyer; Richard C. Litman (57) ABSTRACT

Provided are methods of preparing magnetite and akaganéite nanoparticles from steel slag, the nanoparticles produced therefrom, and methods of using the same as a raw material for wastewater treatment.

20 Claims, 5 Drawing Sheets

(51) Int. Cl.
  *B01J 20/06*   (2006.01)
  *C02F 101/30*   (2006.01)

(56)   References Cited

U.S. PATENT DOCUMENTS

| | | | | |
|---|---|---|---|---|
| 5,652,192 | A | * | 7/1997 | Matson ................. C01B 13/366 |
| | | | | 502/217 |
| 5,916,360 | A | * | 6/1999 | Braun ....................... C09C 1/24 |
| | | | | 423/632 |
| 2008/0067469 | A1 | * | 3/2008 | Eyal ....................... B82Y 30/00 |
| | | | | 423/632 |
| 2020/0141014 | A1 | * | 5/2020 | Harris .................... C01G 49/06 |
| 2020/0222954 | A1 | * | 7/2020 | Kehrmann .............. C22B 7/002 |

FOREIGN PATENT DOCUMENTS

| | | |
|---|---|---|
| CN | 109046226 A | 12/2018 |
| KR | 20150078687 A | 7/2015 |

OTHER PUBLICATIONS

Uzunoglu, et al.; "Synthesis of Iron-containing Nanoparticles from Iron-Steel Industrial Waste for Adsorption of Malachite Green", The Eurasia Proceedings of Science, Technology, Engineering & Mathematics (EPSTEM), 2022 vol. 17, pp. 6-18; Mersin University.

* cited by examiner

PREPARING MAGNETITE AND AKAGANÉITE NANOPARTICLES FROM STEEL SLAG AS A RAW MATERIAL FOR WASTEWATER TREATMENT

BACKGROUND

1. Field

The disclosure of the present patent application relates to the preparation of magnetite and akaganéite nanoparticles from steel slag, and their use in wastewater treatment.

2. Description of the Related Art

Steel slag is generated from the process of steelmaking. Over 400 million tons of iron and steel slag are produced each year worldwide. Most of the slag is recycled in developed countries, mainly for use as a construction aggregate, cement component, landfill cover, and fluxing material in the steel-making process. However, excess steel slag is usually sent to landfills for disposal. Slag dumping can have an impact on the environment due to the release of harmful non-degradable elements present in the slag, which causes environmental problems such as water and soil pollution and, consequently, presents a toxicological risk to humans.

On the other hand, dyes are utilized in many industries such as the textile, rubber, coating, paint, and automobile industries, etc. The major source of dye pollution is caused by textile industries and, for example, in India, textile industries have had a major involvement on economic growth. Different dyes have different chemical and physical properties due to their chemical structure, origin, and application.

Many methods have been applied to eliminate the toxic effect of dyes, such as adsorption, oxidation, reduction, precipitation, etc. During these current processes of dye disposal, different toxic products can be separated and eliminated from effluents into the environment.

Thus, new products and methods for recycling steel slag for a viable use solving the aforementioned problems are desired.

SUMMARY

The present subject matter relates to a new way of recycling steel slag as a low-cost precursor for the synthesis of magnetite and akaganéite nanoparticles with interesting properties and technological applications, such as high-density magnetic recording media, sensors, catalysts, and adsorbents. The present nanoparticles have a large surface area, which can effectively be applied to remove dye from wastewater. Due to the high surface area to volume ratio, it can be combined with a large amount of dye molecules for degradation. Further, since the magnetite and akaganéite nanoparticles have magnetic properties, they can be easily separated from the water after remediation.

In an embodiment, the present subject matter relates to a method of preparing magnetite nanoparticles and akaganéite nanoparticles, the method comprising: obtaining a steel slag; milling and sieving the steel slag to obtain a steel slag powder; suspending the steel slag powder in distilled water to obtain a steel slag suspension; adding HCl to the steel slag suspension under vigorous stirring to obtain an acidified steel slag suspension; slowly adding dropwise a diluted hydrogen peroxide having a concentration of about 5% v/v in water to a first sample of the acidified steel slag suspension to obtain a sample A; rapidly adding under vigorous stirring a concentrated hydrogen peroxide having a concentration of about 20% v/v in water to a second sample of the acidified steel slag suspension to obtain a sample B; separating dark gray precipitates from sample A by centrifugation to obtain a precipitated sample A and a sample A solution; separating dark gray precipitates from sample B by centrifugation to obtain a precipitated sample B and a sample B solution; separating by magnetic decantation a magnetite rich solid from the precipitated sample B to obtain the magnetite nanoparticles; adding dropwise and under magnetic stirring a concentrated ammonia having a concentration of about 25% v/v in water to the sample A solution until the sample A solution reaches a pH of 6 to obtain a neutralized sample A; adding dropwise and under magnetic stirring a concentrated ammonia having a concentration of about 25% v/v in water to the sample B solution until the sample B solution reaches a pH of 6 to obtain a neutralized sample B; and separating brown solids by centrifugation from the neutralized sample A and the neutralized sample B to obtain first and second akaganéite nanoparticles, respectively.

In another embodiment, the present subject matter relates to magnetite nanoparticles and akaganéite nanoparticles prepared according to the methods as described herein.

In a further embodiment, the present subject matter relates to a method for removing dye from a sample, the method comprising: contacting a sample with the magnetite nanoparticles and the akaganéite nanoparticles as obtained and described herein; adsorbing the dye in the sample on the magnetite nanoparticles and the akaganéite nanoparticles; and collecting the sample having at least about 80% of the dye removed.

In an additional embodiment, the present subject matter relates to a method of preparing magnetite nanoparticles and akaganéite nanoparticles, the method comprising: suspending a steel slag powder in distilled water to obtain a steel slag suspension; adding HCl to the steel slag suspension under vigorous stirring to obtain an acidified steel slag suspension; slowly adding dropwise a diluted hydrogen peroxide having a concentration of about 5% v/v in water to a first sample of the acidified steel slag suspension to obtain a sample A; rapidly adding under vigorous stirring a concentrated hydrogen peroxide having a concentration of about 20% v/v in water to a second sample of the acidified steel slag suspension to obtain a sample B; separating dark gray precipitates from sample A by centrifugation to obtain a precipitated sample A and a sample A solution; separating dark gray precipitates from sample B by centrifugation to obtain a precipitated sample B and a sample B solution; separating by magnetic decantation a magnetite rich solid from the precipitated sample B to obtain the magnetite nanoparticles; adding dropwise and under magnetic stirring a concentrated ammonia having a concentration of about 25% v/v in water to the sample A solution until the sample A solution reaches a pH of 6 to obtain a neutralized sample A; adding dropwise and under magnetic stirring a concentrated ammonia having a concentration of about 25% v/v in water to the sample B solution until the sample B solution reaches a pH of 6 to obtain a neutralized sample B; and separating brown solids by centrifugation from the neutralized sample A and the neutralized sample B to obtain first and second akaganéite nanoparticles, respectively.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

The present subject matter relates to a new way of recycling steel slag as a low-cost precursor for the synthesis of magnetite and akaganéite nanoparticles with interesting properties and technological applications, such as high-density magnetic recording media, sensors, catalysts, and adsorbents. The present nanoparticles have a large surface area, which can effectively be applied to remove dye from wastewater. Due to the high surface area to volume ratio, it can be combined with a large amount of dye molecules for degradation. Further, since the magnetite and akaganéite nanoparticles have magnetic properties, they can be easily separated from the water after remediation.

In an embodiment, the present subject matter relates to a method of preparing magnetite nanoparticles and akaganéite nanoparticles, the method comprising: obtaining a steel slag; milling and sieving the steel slag to obtain a steel slag powder; suspending the steel slag powder in distilled water to obtain a steel slag suspension; adding HCl to the steel slag suspension under vigorous stirring to obtain an acidified steel slag suspension; slowly adding dropwise a diluted hydrogen peroxide having a concentration of about 5% v/v in water to a first sample of the acidified steel slag suspension to obtain a sample A; rapidly adding under vigorous stirring a concentrated hydrogen peroxide having a concentration of about 20% v/v in water to a second sample of the acidified steel slag suspension to obtain a sample B; separating dark gray precipitates from sample A by centrifugation to obtain a precipitated sample A and a sample A solution; separating dark gray precipitates from sample B by centrifugation to obtain a precipitated sample B and a sample B solution; separating by magnetic decantation a magnetite rich solid from the precipitated sample B to obtain the magnetite nanoparticles; adding dropwise and under magnetic stirring a concentrated ammonia having a concentration of about 25% v/v in water to the sample A solution until the sample A solution reaches a pH of 6 to obtain a neutralized sample A; adding dropwise and under magnetic stirring a concentrated ammonia having a concentration of about 25% v/v in water to the sample B solution until the sample B solution reaches a pH of 6 to obtain a neutralized sample B; and separating brown solids by centrifugation from the neutralized sample A and the neutralized sample B to obtain first and second akaganéite nanoparticles, respectively.

In an additional embodiment, the present subject matter relates to a method of preparing magnetite nanoparticles and akaganéite nanoparticles, the method comprising: suspending a steel slag powder in distilled water to obtain a steel slag suspension; adding HCl to the steel slag suspension under vigorous stirring to obtain an acidified steel slag suspension; slowly adding dropwise a diluted hydrogen peroxide having a concentration of about 5% v/v in water to a first sample of the acidified steel slag suspension to obtain a sample A; rapidly adding under vigorous stirring a concentrated hydrogen peroxide having a concentration of about 20% v/v in water to a second sample of the acidified steel slag suspension to obtain a sample B; separating dark gray precipitates from sample A by centrifugation to obtain a precipitated sample A and a sample A solution; separating dark gray precipitates from sample B by centrifugation to obtain a precipitated sample B and a sample B solution; separating by magnetic decantation a magnetite rich solid from the precipitated sample B to obtain the magnetite nanoparticles; adding dropwise and under magnetic stirring a concentrated ammonia having a concentration of about 25% v/v in water to the sample A solution until the sample A solution reaches a pH of 6 to obtain a neutralized sample A; adding dropwise and under magnetic stirring a concentrated ammonia having a concentration of about 25% v/v in water to the sample B solution until the sample B solution reaches a pH of 6 to obtain a neutralized sample B; and separating brown solids by centrifugation from the neutralized sample A and the neutralized sample B to obtain first and second akaganéite nanoparticles, respectively.

In an embodiment of the present methods of production, the steel slag can have a size gradation of more than 0 to about 100 mm. Similarly, in an embodiment, the steel slag powder can have a particle size of about 100 to about 250 µm.

In certain embodiments, the produced magnetite nanoparticles can comprise silica based composites containing magnetite and different metal oxides. In this regard, the different metal oxides can comprise iron oxide.

In another embodiment, the steel slag suspension can comprise about 0.5 g/mL of the steel slag powder in the water.

In a further embodiment, the HCl can be about 5M HCl. In another embodiment, after the addition of the HCl to the steel slag suspension, the steel slag suspension can be stirred for at least about 24 hours.

Similarly, in additional embodiments, about 350 ml of the diluted hydrogen peroxide can be added to the first sample of the acidified steel slag suspension and about 350 ml of the concentrated hydrogen peroxide can be added to the second sample of the acidified steel slag suspension.

In other embodiments, after the dark gray precipitates are separated from the sample B, the dark gray precipitates can be washed with distilled water and air dried at a temperature of about 110° C. to about 130° C., about 110° C., about 115° C., about 120° C., about 125° C., about 130° C., or about 120° C. for at least about 12 hours to obtain the precipitated sample B.

Similarly, after the brown solids are separated from the neutralized sample A and the neutralized sample B, the brown solids can be washed with distilled water and air dried at a temperature of about 110° C. to about 130° C., about 110° C., about 115° C., about 120° C., about 125° C., about 130° C., or about 120° C. for at least about 12 hours to obtain the first and second akaganéite nanoparticles, respectively.

In another embodiment, the present subject matter relates to magnetite nanoparticles and akaganéite nanoparticles prepared according to the methods as described herein.

In an embodiment, the magnetite nanoparticles and the akaganéite nanoparticles can have a non-spherical shape. Further, the magnetite nanoparticles and the akaganéite nanoparticles can have a particle size of about 10 µm or less.

In certain embodiments, the magnetite nanoparticles and the akaganéite nanoparticles provided for herein can be configured to be used as high-density magnetic recording media, sensors, catalysts, or adsorbents.

In a further embodiment, the present subject matter relates to a method for removing dye from a sample, the method comprising: contacting a sample with the magnetite nanoparticles and the akaganéite nanoparticles as obtained and described herein; adsorbing the dye in the sample on the magnetite nanoparticles and the akaganéite nanoparticles; and collecting the sample having at least about 80% of the dye removed.

In certain embodiments, the sample can be wastewater. In further embodiments, the wastewater can be wastewater from a textile-based process, such as from a textile mill.

In additional embodiments in this regard, the collected sample can have at least about 95% of the dye removed.

In further embodiments, the dye removed from the sample can be Congo red. In other embodiments, the dye removed from the sample can be selected from the group consisting of an acid dye, a basic dye, a direct dye, a vat dye, a disperse dye, a nitro dye, a mordant dye, a sulfur dye, or an azo dye. In this regard, the dye removed from the sample can be Acid yellow 36, Acid orange 7, Acid blue 83, Acid blue 7, Methylene blue (MB), Basic red 1 or rhodamine 6G, Basic yellow 2, Congo red (CR), Direct red 28, Direct black 38, Vat blue 1, Vat acid blue 74, Disperse red 9, Disperse violet 1, Disperse red 60, Naphthol yellow (II), Mordant red 11, Mordant Black 17, C.I. reactive red 120, C.I. reactive red 147, C.I. reactive blue 19, Sulfur brilliant green, Sulfur blue, Sulfur Black 1, Leuco Sulfur Black 1, Phthalic anhydride, Direct Black 22, Disperse Yellow 7, Acid Orange 20, Methyl red, Methyl orange (MO), Trypan blue, and any combination thereof.

The present teachings are illustrated by the following examples.

EXAMPLES

Example 1

Preparation of the Magnetite Nanoparticles and the Akaganéite Nanoparticles

The steel slag was provided by the steel plant ArcelorMittal Aviles, located in the North of Spain. The steel slag, with a size gradation 0-10 mm, was milled and sieved to obtain a powder with a particle size of 100-250 µm. Akaganéite nanoparticles and silica-based composites containing magnetite and different metal oxides were obtained as follows: 50 g of steel slag was suspended in 100 mL of distilled water. Then, under vigorous stirring 300 mL of 5M HCl was added, and the suspension was stirred for 24 h. Then, 350 ml of hydrogen peroxide (5 and 20% v/v) were added to the suspension as follows: i) Diluted $H_2O_2$ (5% v/v) was added slowly (dropwise), obtaining sample A; ii) Concentrated $H_2O_2$ (20% v/v) was added rapidly under vigorous stirring, sample B. The dark gray precipitates were separated from the solution by centrifugation, washed with distilled water, and air dried at 120° C. for 12 hours. By magnetic decantation, a magnetite-rich solid, sample M, was separated from sample B. To the solutions (i) and (ii) from which samples A and B were separated by centrifugation, concentrated ammonia (25%) was added dropwise and under magnetic stirring until pH 6 was reached. The brown solids obtained, AK(i) and AK(ii), were centrifuged, washed with distilled water, and dried at 120° C. for 12 hours.

Example 2

Dye Absorption

Figures 1A, 1B:
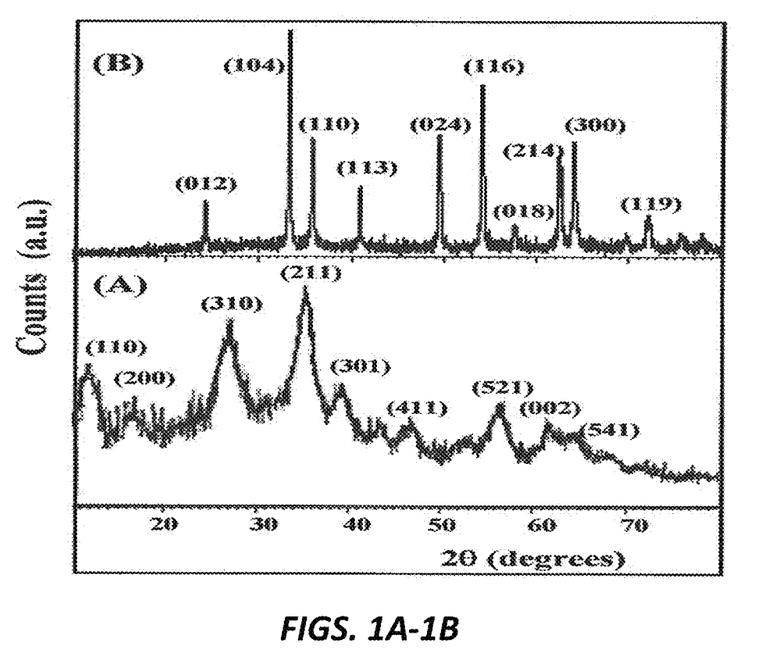
FIGS. 1A-1B show X-ray diffraction patterns of 1(A) a sample of akaganéite nanoparticles (i); and 1(B) a sample of akaganéite nanoparticles heated at 400° C.
Figure 2:
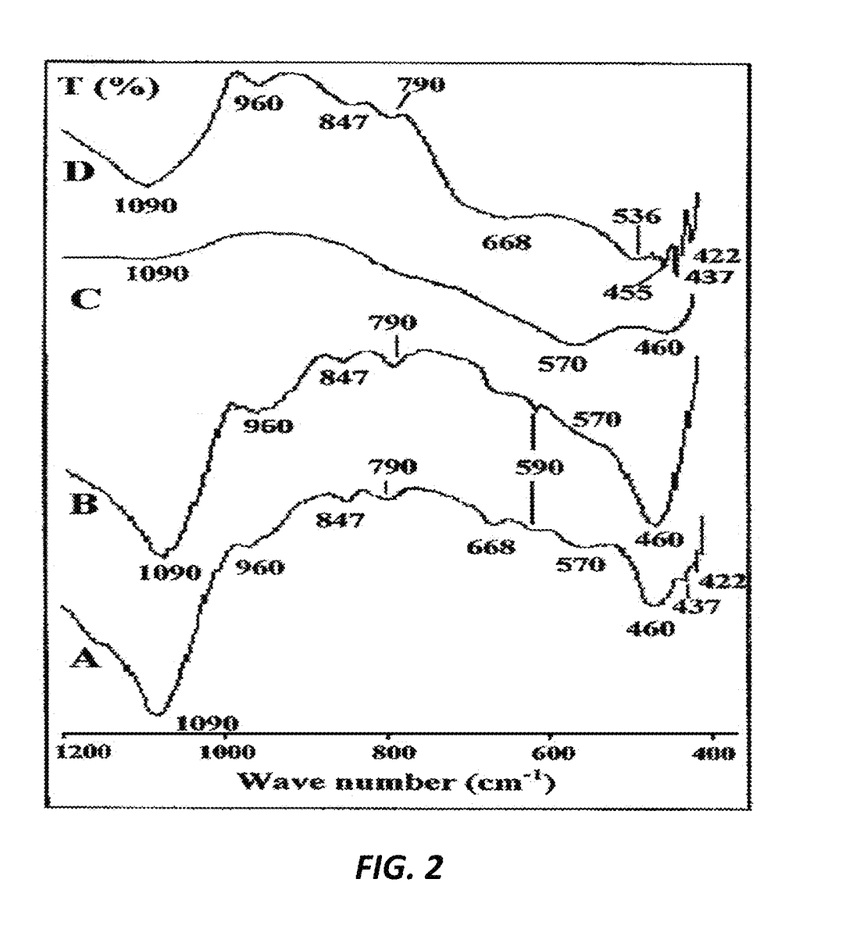
FIG. 2 shows FTIR transmission spectra (1200-400 $cm^{-1}$) of: Pattern A—sample A; Pattern B—sample C; Pattern C—sample M; and Pattern D—sample AK.
Figure 3:
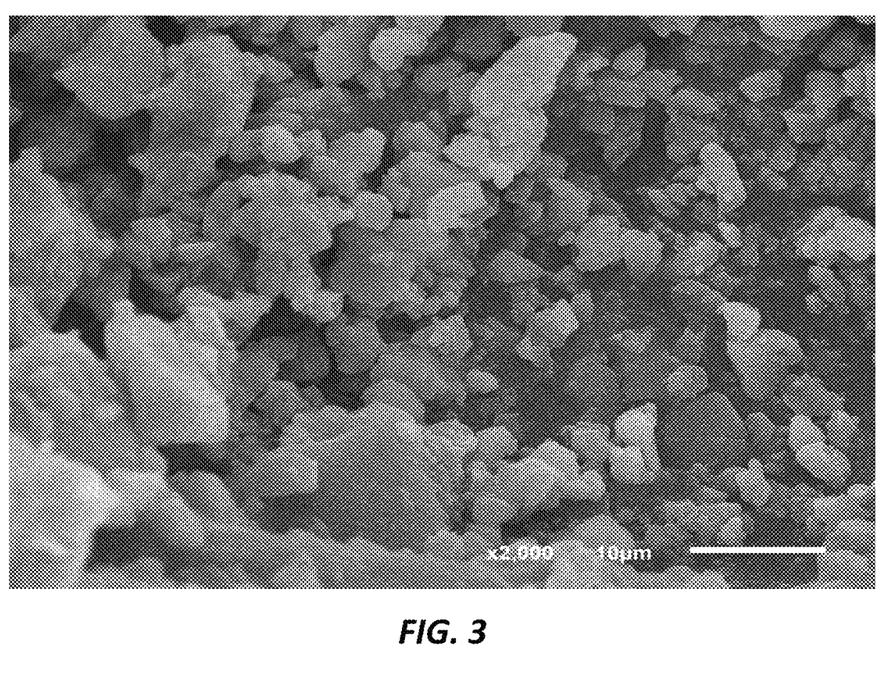
FIG. 3 shows a SEM image (×2000) of akaganéite nanoparticles produced according to the methods described herein.
Figure 4A:
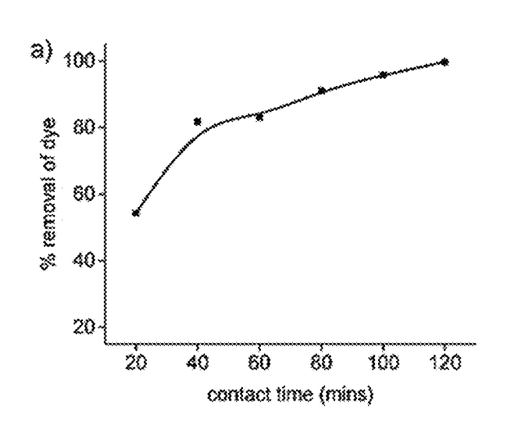
FIGS. 4A-B are charts showing 4A) Congo red dye % removal with contact time; and 4B) adsorption capacity (Qe) of Congo red dye with concentration for the present magnetite and akaganéite nanoparticles.
Figure 4B:
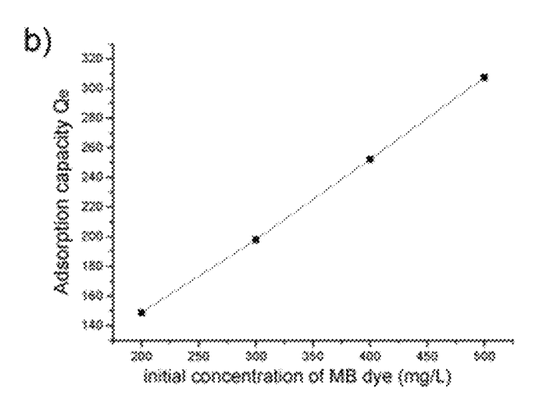
Figure 5:
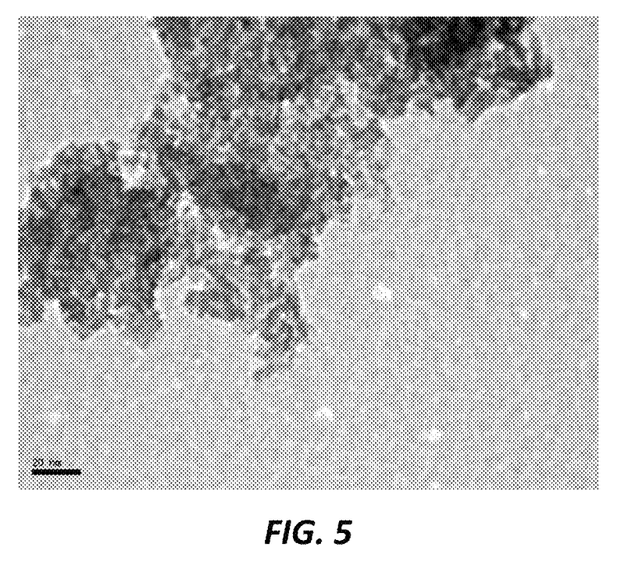
FIG. 5 shows a TEM image of akaganéite nanoparticles produced according to the present methods.

A dye adsorption study of the present magnetite and akaganéite nanoparticles was conducted on a concentration of Congo red (MB) (300 mg/L) solution and the nanoparticles (20 mg) in a conical flask (at pH~7). The solution was shaken thoroughly for 120 min at room temperature. At an interval of 10 min, the optical density (OD) was checked for each solution for adsorption kinetic study, with the results as shown in FIGS. 4A-4B.

It is to be understood that the magnetite and akaganéite nanoparticles prepared from steel slag are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of preparing magnetite nanoparticles and akaganéite nanoparticles, the method comprising:
   obtaining a steel slag;
   milling and sieving the steel slag to obtain a steel slag powder;
   suspending the steel slag powder in distilled water to obtain a steel slag suspension;
   adding HCl to the steel slag suspension under vigorous stirring to obtain an acidified steel slag suspension;
   slowly adding dropwise a diluted hydrogen peroxide having a concentration of about 5% v/v in water to a first sample of the acidified steel slag suspension to obtain a sample A;
   rapidly adding under vigorous stirring a concentrated hydrogen peroxide having a concentration of about 20% v/v in water to a second sample of the acidified steel slag suspension to obtain a sample B;
   separating dark gray precipitates from sample A by centrifugation to obtain a precipitated sample A and a sample A solution;
   separating dark gray precipitates from sample B by centrifugation to obtain a precipitated sample B and a sample B solution;
   separating by magnetic decantation a magnetite rich solid from the precipitated sample B to obtain the magnetite nanoparticles;
   adding dropwise and under magnetic stirring a concentrated ammonia having a concentration of about 25% v/v in water to the sample A solution until the sample A solution reaches a pH of 6 to obtain a neutralized sample A;
   adding dropwise and under magnetic stirring a concentrated ammonia having a concentration of about 25% v/v in water to the sample B solution until the sample B solution reaches a pH of 6 to obtain a neutralized sample B; and
   separating brown solids by centrifugation from the neutralized sample A and the neutralized sample B to obtain first and second akaganéite nanoparticles, respectively.

2. The method of claim 1, wherein the steel slag has a size gradation of more than 0 to about 100 mm.

3. The method of claim 1, wherein the steel slag powder has a particle size of about 100 to about 250 μm.

4. The method of claim 1, wherein the magnetite nanoparticles comprise silica based composites containing magnetite and different metal oxides.

5. The method of claim 4, wherein the different metal oxides comprise iron oxide.

6. The method of claim 1, wherein the steel slag suspension comprises about 0.5 g/mL of the steel slag powder in the water.

7. The method of claim 1, wherein the HCl is about 5M HCl.

8. The method of claim 1, wherein after the addition of the HCl to the steel slag suspension, the steel slag suspension is stirred for at least about 24 hours.

9. The method of claim 1, wherein about 350 ml of the diluted hydrogen peroxide is added to the first sample of the acidified steel slag suspension.

10. The method of claim 1, wherein about 350 ml of the concentrated hydrogen peroxide is added to the second sample of the acidified steel slag suspension.

11. The method of claim 1, wherein after the dark gray precipitates are separated from the sample B, the dark gray precipitates are washed with distilled water and air dried at a temperature of about 110° C. to about 130° C. for at least about 12 hours to obtain the precipitated sample B.

12. The method of claim 1, wherein after the brown solids are separated from the neutralized sample A and the neutralized sample B, the brown solids are washed with distilled water and air dried at a temperature of about 110° C. to about 130° C. for at least about 12 hours to obtain the first and second akaganéite nanoparticles, respectively.

13. Magnetite nanoparticles and akaganéite nanoparticles prepared according to the method of claim 1.

14. The magnetite nanoparticles and the akaganéite nanoparticles of claim 13, having a non-spherical shape.

15. The magnetite nanoparticles and the akaganéite nanoparticles of claim 13, having a particle size of about 10 μm or less.

16. The magnetite nanoparticles and the akaganéite nanoparticles of claim 13, configured to be used as high-density magnetic recording media, sensors, catalysts, or adsorbents.

17. A method for removing dye from a sample, the method comprising:
   contacting a sample with the magnetite nanoparticles and the akaganéite nanoparticles of claim 13;
   adsorbing the dye in the sample on the magnetite nanoparticles and the akaganéite nanoparticles; and
   collecting the sample having at least about 80% of the dye removed.

18. The method of claim 17, wherein the collected sample has at least about 95% of the dye removed.

19. The method of claim 17, wherein the dye is Congo red.

20. A method of preparing magnetite nanoparticles and akaganéite nanoparticles, the method comprising:
   suspending a steel slag powder in distilled water to obtain a steel slag suspension;
   adding HCl to the steel slag suspension under vigorous stirring to obtain an acidified steel slag suspension;
   slowly adding dropwise a diluted hydrogen peroxide having a concentration of about 5% v/v in water to a first sample of the acidified steel slag suspension to obtain a sample A;

rapidly adding under vigorous stirring a concentrated hydrogen peroxide having a concentration of about 20% v/v in water to a second sample of the acidified steel slag suspension to obtain a sample B;

separating dark gray precipitates from sample A by centrifugation to obtain a precipitated sample A and a sample A solution;

separating dark gray precipitates from sample B by centrifugation to obtain a precipitated sample B and a sample B solution;

separating by magnetic decantation a magnetite rich solid from the precipitated sample B to obtain the magnetite nanoparticles;

adding dropwise and under magnetic stirring a concentrated ammonia having a concentration of about 25% v/v in water to the sample A solution until the sample A solution reaches a pH of 6 to obtain a neutralized sample A;

adding dropwise and under magnetic stirring a concentrated ammonia having a concentration of about 25% v/v in water to the sample B solution until the sample B solution reaches a pH of 6 to obtain a neutralized sample B; and separating brown solids by centrifugation from the neutralized sample A and the neutralized sample B to obtain first and second akaganéite nanoparticles, respectively.

* * * * *

UNITED STATES PATENT AND TRADEMARK OFFICE
CERTIFICATE OF CORRECTION

PATENT NO. : 11,873,233 B1
APPLICATION NO. : 18/211747
DATED : January 16, 2024
INVENTOR(S) : Mai Mustafa Khalaf Ali et al.

Page 1 of 1

It is certified that error appears in the above-identified patent and that said Letters Patent is hereby corrected as shown below:

On the Title Page

Inventors item (72), for Inventors 3-4, please delete and replace with the updated residences as follows:
María A. Villa-García, Oviedo (Spain), Ahmed M. Abu-Dief, Al-Madina Al-Mounawara (SA)

Signed and Sealed this
Twenty-seventh Day of February, 2024

Katherine Kelly Vidal
*Director of the United States Patent and Trademark Office*